(12) United States Patent
Choi et al.

(10) Patent No.: US 6,726,889 B2
(45) Date of Patent: Apr. 27, 2004

(54) PRODUCTION OF ZINC OXIDE FROM ACID SOLUBLE ORE USING PRECIPITATION METHOD

(75) Inventors: Yeonuk Choi, Pointe-Claire (CA); Serge Payant, Pointe-Claire (CA); Joo Kim, Pointe-Claire (CA); Anna-Maria Giove, Pierrefonds (CA); Ramachandra Rao, Montreal (CA); James Andrew Finch, Montreal (CA)

(73) Assignee: Noranda, Inc. (CA)

( * ) Notice: Subject to any disclaimer, the term of this patent is extended or adjusted under 35 U.S.C. 154(b) by 79 days.

(21) Appl. No.: 10/199,512

(22) Filed: Jul. 22, 2002

(65) Prior Publication Data

US 2003/0031611 A1 Feb. 13, 2003

Related U.S. Application Data

(63) Continuation of application No. 09/617,534, filed on Jul. 14, 2000, now abandoned.

(51) Int. Cl.$^7$ ................................................ C22B 19/00
(52) U.S. Cl. ........................ 423/101; 423/102; 423/109; 423/140; 423/339; 423/555
(58) Field of Search ................. 423/101, 102, 423/109, 140, 339, 555; 209/12.1, 164, 166

(56) References Cited

U.S. PATENT DOCUMENTS

| | | |
|---|---|---|
| 3,656,941 A | 4/1972 | Matthew et al. |
| 3,954,937 A | 5/1976 | Bodson |
| 3,976,743 A | 8/1976 | Landucci et al. |
| 4,619,814 A | 10/1986 | Salter et al. |
| 4,889,694 A | 12/1989 | Spink et al. |
| 4,992,248 A | 2/1991 | Watanabe et al. |
| 5,380,354 A | 1/1995 | Chalkley et al. |
| 5,585,079 A | 12/1996 | Fugleberg |
| 6,395,242 B1 * | 5/2002 | Allen et al. .................. 423/101 |

FOREIGN PATENT DOCUMENTS

GB 138948 2/1920

* cited by examiner

Primary Examiner—Steven Bos
(74) Attorney, Agent, or Firm—Katten Muchin Zavis Rosenman

(57) ABSTRACT

The present invention relates to an apparatus and a process for producing zinc oxide from an acid soluble zinc-bearing material. The process according to the present invention comprises the steps of leaching the zinc oxide material with sulphuric acid; precipitating iron and silica from the leach solution using calcium oxide; removing copper, cadmium and cobalt from the leach solution by cementation with zinc dust; precipitating zinc oxide from the leach solution using calcium oxide; and upgrading zinc content in zinc oxide precipitates by separating zinc oxide from gypsum using a flotation or granulometric sizing technique.

20 Claims, 3 Drawing Sheets

PRODUCTION OF ZINC OXIDE FROM ACID SOLUBLE ORE USING PRECIPITATION METHOD

This application is a continuation of application Ser. No. 09/617,534, filed Jul. 14, 2000 now abandoned and incorporated herein by reference.

BACKGROUND OF THE INVENTION

1. Field of the Invention

The present invention relates to method and apparatus for the extraction and recovery of zinc from zinc-bearing materials (solutions or solids) through a process carried out in a sulphuric acid media by leaching the zinc followed by precipitation of zinc as oxide and upgrading zinc content in precipitates by flotation or granulometric sizing.

2. Description of the Related Art

Acid soluble zinc ores (zinc oxide, zinc carbonate, zinc silicate, etc.) have been used in the production of zinc metal since the very beginnings of the industry. The leaching of theses ores and purification of impurities associated with these ores are well established. Wood, in a paper published in the Journal of Metals, Vol. 29, page 7, incorporated herein by reference, describes a process for the hydrometallurgical treatment of zinc silicate. U.S. Pat. No. 3,954,937, incorporated herein by reference, provide a process which utilizes a series of leaching tanks in which the acidity is progressively increased over a period of at least three hours, in such a quantity that the final acidity of the solution will be 1.5 to 15 g/l, while carefully maintaining the temperature at 70° to 90° C., thereby inducing the lixiviation of the material and simultaneously the reprecipitation of silica in a crystalline form which can be eliminated by filtration. U.S. Pat. No. 3,656,941, incorporated herein by reference, describes a process for the recovery of metal values from a siliceous zinc ore whereby the ore is treated with sulphuric acid in a continuous manner in stirred tanks. U.S. Pat. No. 5,585,079, incorporated herein by reference, describes a method for recovering zinc from a zinc oxide bearing material containing silicates. According to this method, the leaching of zinc compounds is carried out in circumstances where the silicates remain undissolved and consequently do not cause filtering problems. The silicate bearing residue is treated in a Waelz process.

Although, there are many processes that can provide a method to dissolve zinc from the acid soluble zinc ore and precipitate impurities such as iron and silica to make filtrate filterable, none of the above-mentioned techniques addresses a process to recover zinc from zinc bearing solutions. Most of the above-mentioned processes use conventional electrowinning process to recover zinc from zinc sulphate solutions. Electrowinning is well known technology, however, it requires high capital cost. Therefore, it is only suitable technology if the metal value is significant enough to build an electrowinning plant or, otherwise, a recovery process has to be located at and integrated with present zinc refineries.

Another problem with the conventional electrowinning process is that the zinc concentration level must be higher than a certain level to operate. Therefore, if the zinc concentration in the final filtrate of the leaching operation is not high enough, the zinc concentration in the filtrate of leached acid soluble zinc materials has to be upgraded.

Zinc in the solution can be concentrated by several known methods, such as solvent extraction or ion exchange. However, those processes have several drawbacks, such as limitation of extraction capacity, organic substance contamination and high capital cost. In addition, these approaches still require a conventional electrowinning process to recover zinc from zinc bearing solution.

Another approach to recover zinc from the zinc bearing solution is to precipitate zinc from the solution itself The precipitated zinc now can be easily sent to the zinc refinery or other facilities which requires such materials. Zinc can be precipitated from zinc sulphate solution as zinc oxide, zinc hydroxide, or basic zinc sulphate by adding alkaline. Also, zinc can be precipitated as zinc sulphide by adding sulphide or as zinc carbonate by adding carbon dioxide. However, the operation of the process for producing zinc sulphide or zinc carbonate is expensive. Also, producing zinc hydroxide causes severe filtering problems and producing basic zinc sulphate results in high transportation cost since the grade of zinc in basic zinc sulphate is very low. Producing zinc oxide is the most suitable approach, but unless you are using sodium hydroxide, which is very expensive reagent, the zinc oxide will be contaminated with a large amount of gypsum that is co-precipitated during zinc oxide precipitation.

Therefore, it is desirable to develop a process for producing zinc oxide from zinc sulphate solution that is originated from acid soluble zinc materials.

SUMMARY OF THE INVENTION

It is an object of the invention to provide an apparatus for producing zinc oxide from an acid soluble zinc-containing material. The apparatus comprises a leaching unit for leaching the acid soluble zinc-containing material with sulphuric acid, a first precipitating unit for precipitating iron, silica and other metals (Al, As, Sb, etc.) from the leach solution using calcium oxide (or $Ca(OH)_2$, MgO, ZnO), and removing, copper, cadmium, nickel and cobalt from the leach solution by cementation with zinc dust. A second precipitating unit is used to precipitate zinc oxide from the leach solution using calcium oxide (or $Ca(OH)_2$). Then the precipitated zinc oxide is separated from calcium sulphate by flotation with cationic collectors such as dodecylamine hydrochloride, and dodecylamine sulphate, and/or potassium amyl xanthate as a collector. This separation of zinc oxide from calcium sulphate also can be achieved by granulometric sizing. In addition, a combination of the two techniques (sizing and flotation) can be used for separating of zinc oxide from calcium sulphate. In addition, the tailing of these steps can be recycled to the leaching step to recover zinc value.

A further object of the present invention is to provide a process for producing zinc oxide from an acid soluble zinc-containing material. The process comprises the steps of leaching the acid soluble zinc material with sulphuric acid, precipitating iron, silica and other metals (Al, As, Sb, etc.) from the leach solution using calcium oxide (or $Ca(OH)_2$, MgO, ZnO), cementing copper, cadmium, nickel and cobalt in the leach solution with zinc dust, and precipitating zinc oxide from the leach solution using calcium oxide (or $Ca(OH)_2$). Then the precipitated zinc oxide is separated from calcium sulphate by flotation with cationic collectors such as dodecylamine hydrochloride, and dodecylamine sulphate, and/or potassium amyl xanthate. The separation of zinc oxide from calcium sulphate can also be achieved by granulometric sizing. In addition, a combination of the two techniques (granulometric sizing and flotation) can be used for separating zinc oxide from calcium sulphate. The tailing of these steps can also be recycled to the leaching step to recover zinc value.

Still another object of the present invention is to provide a zinc oxide precipitate that is substantially free of basic zinc sulphate by leaching an acid soluble zinc-containing material with sulphuric acid. Iron, silica and other metals (Al, As, Sb, etc.) are precipitated from the leach solution using calcium oxide (or $Ca(OH)_2$, MgO, ZnO), and copper, cadmium, nickel and cobalt are cemented from the leach solution using zinc dust. Zinc oxide is precipitated from the leach solution using calcium oxide.

A further object of the present invention is to provide a process for recovering copper and cadmium from an acid soluble zinc-containing material. The process comprises the steps of leaching the acid soluble zinc material with sulphuric acid, precipitating iron, silica and other metals (Al, As, Sb, etc.) from the leach solution using calcium oxide (or $Ca(OH)_2$, MgO, ZnO) and recovering copper and cadmium from the leach solution by cementing with zinc dust.

Still another object of the present invention is to provide a process for separating zinc oxide from gypsum, which precipitates during zinc oxide precipitation. The process comprised the steps of leaching the acid soluble zinc-containing material with sulphuric acid, precipitating iron, silica and other metals (AL, As, Sb, etc.) from the leach solution using calcium oxide (or $Ca(OH)_2$, MgO, ZnO), and cementing copper, cadmium, nickel and cobalt from the leach solution using zinc dust. The precipitated zinc oxide is separated from co-precipitated gypsum by flotation with cationic collectors such as dodecylamine hydrochloride, and dodecylamine sulphate, and/or potassium amyl xanthate as a collector. The separation of zinc oxide from calcium sulphate can also be achieved by granulometric sizing. In addition, a combination of the two techniques (granulometric sizing and flotation) can be used for separating zinc oxide from calcium sulphate. The tailing of the flotation step can also be recycled to the leaching step to recover zinc value.

The invention is described in more detail below with reference to the accompanying figure.

DESCRIPTION OF THE PREFERRED EMBODIMENTS

1. Introduction

Figure 1:
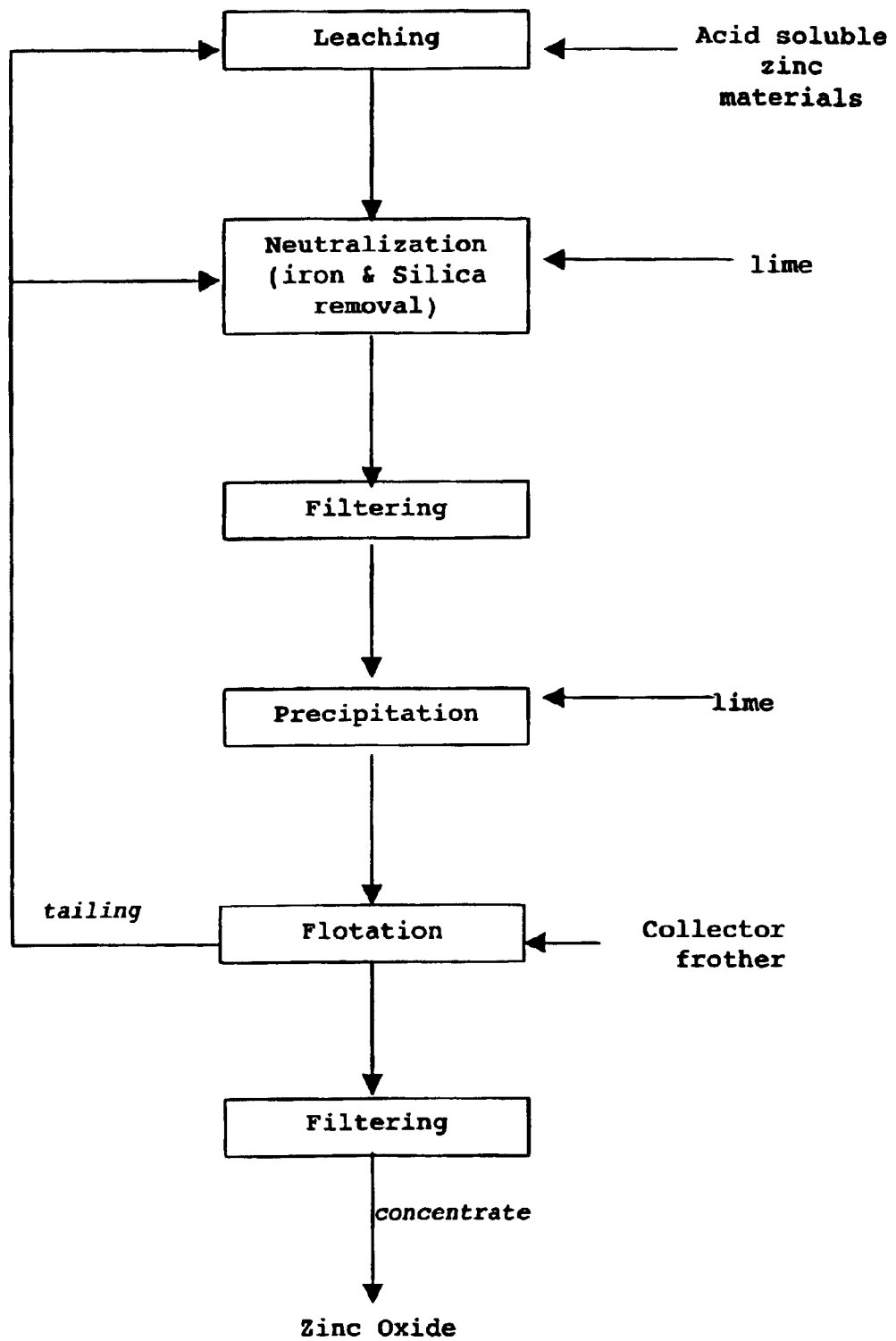
FIG. 1 is a flowchart illustrating the preferred process for producing zinc oxide from an acid soluble zinc material using the invented process.
Figure 2:
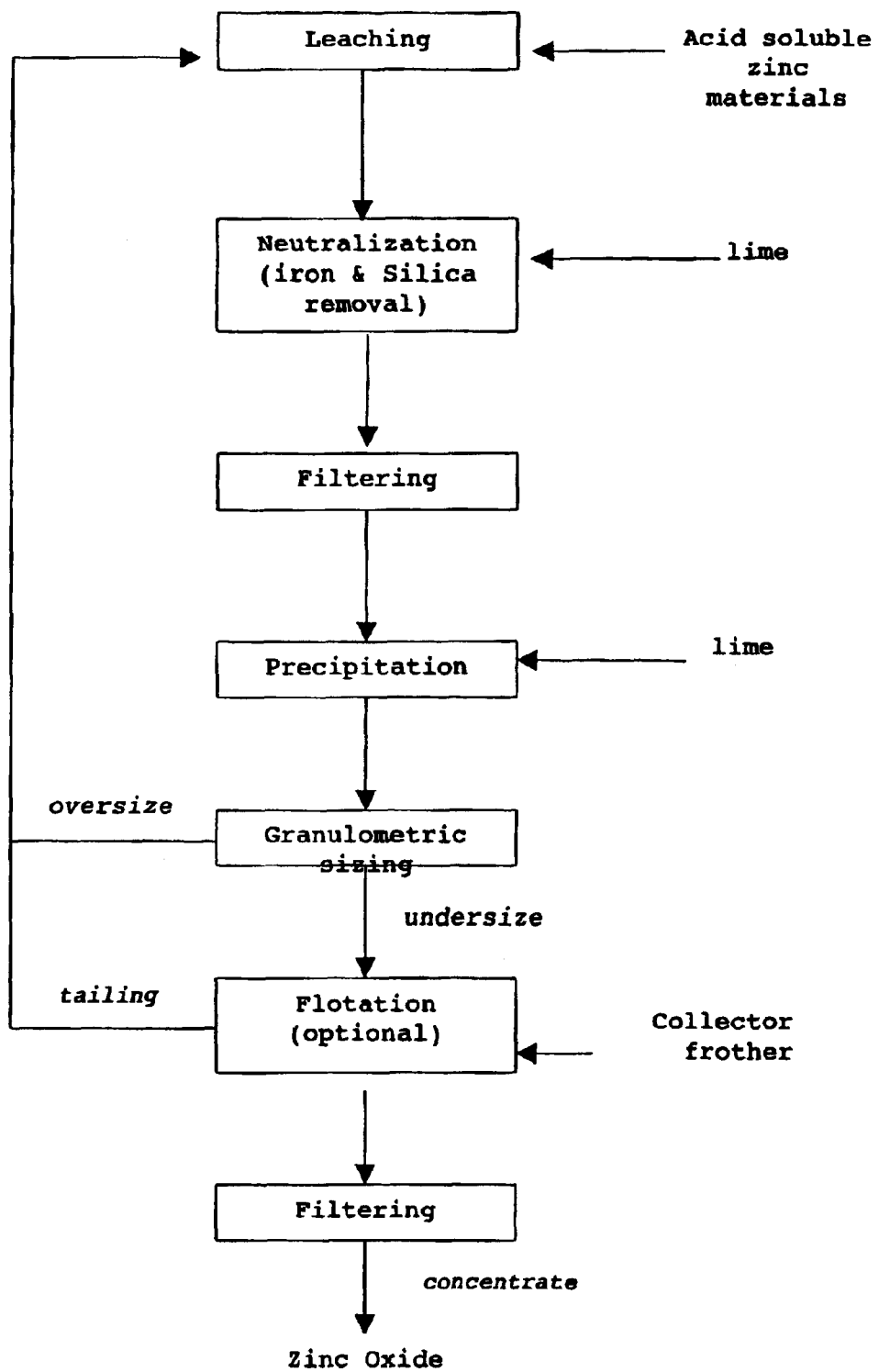
FIG. 2 is a flowchart illustrating the preferred process for producing zinc oxide from an acid soluble zinc material using the invented process including the granulometric sizing stage.

The present invention relates to method and apparatus for the extraction and recovery of zinc from zinc-bearing materials (solutions or solids) through a process carried out in a sulphuric acid media by leaching the zinc followed by precipitation of zinc as oxide and upgrading the zinc content in precipitates by flotation or granulometric sizing. This upgrading of zinc also can be achieved by using a granulometric sizing technique. This process also allows for the recovery of other metals, such as iron, copper, nickel, cobalt, lead, silver, cadmium, etc. The present invention further relates to a process for producing zinc oxide from an acid soluble zinc material, an apparatus for performing the process, and processes for recovering iron, copper, and cadmium from an acid soluble zinc material. More particularly, the invention relates to a process of producing zinc oxide from such an acid soluble zinc material by, preferably, leaching the acid soluble zinc material with sulphuric acid, followed by precipitation of iron, silica and other metals (Al, As, Sb, etc.) from the leach solution using calcium oxide (or $Ca(OH)_2$, MgO, ZnO), and cementation of copper, cadmium and cobalt using zinc dust. Zinc oxide may then be precipitated from the leach solution using calcium oxide as a mixture of zinc oxide and calcium sulphate. The zinc grade in the mixture of zinc oxide and calcium sulphate may be improved by flotation and/or granulometric sizing techniques. The novelty of this invention is precipitating zinc oxide from zinc sulphate solution and upgrading zinc content by flotation and/or granulometric sizing techniques.

By the phrase "acid soluble zinc materials" as used in this specification is meant primarily a zinc silicate ore but it is also intended to include zinc oxide ore, zinc carbonate ore and a zinc materials containing substantial quantities of soluble zinc in sulphuric acid.

The presently preferred process of the present invention is comprised of a series of steps, as will be described in detail below.

2. Leaching and Neutralization

According to a preferred embodiment of the present invention there is provided a process for the recovery of metal values from an acid soluble ore, where the process is conducted in a continuous concurrent manner. A process comprises a first stage, effected in one or more vessels, in which the said ore is leached with aqueous sulphuric acid to an end-point pH in the range 1.0 to 4.0, preferably in the range 1.5 to 2.5, to obtain a leach liquor or pulp containing dissolved zinc values and other impurities including silica and iron. A second stage, effected in one or more vessels, in which the pH of the liquor or pulp from the first stage is raised, for example by addition of neutralising agent, to a pH in the range 3 to 6, preferably in the range 3.5 to 4.5, such that substantially the whole or a major part of the silica content of said leach liquor or pulp is converted into a form in which it is readily separated by conventional techniques.

Both process stages may be operated successfully at temperatures up to the boiling points of the solutions at atmospheric pressure, and operating temperatures between ambient temperature and about 95° C. are therefore envisaged. The aqueous sulphuric acid necessary for the treatment of the acid soluble ores. Spent electrolyte from a conventional process for the electrowinning of zinc, or such spent electrolyte fortified to compensate for acid losses, may conveniently be used as a leaching agent. Residence times of the liquor or pulp in each of the process stages may lie in the range 30 minutes to 10 hours, with a preferred residence time in the first stage of 1–4 hours, and a preferred residence time in the second stage of 1 to 6 hours.

The pulp leaving from the second stage contains suspended silica and iron hydroxide in particulate form, and will be subjected to solid liquid separation by using thickening process or conventional filtering technology. In some circumstance it may be desirable to re-circulate portions of pulp or thickened pulp from the second stage to first or second stages of the process. The filtrate from this step is sent to cementation.

3. Zinc Oxide Precipitation

At a third stage, the pH of the liquor from solid-liquid separation process right after second stage is raised, for example by the addition of neutralising agent such as lime, to a pH in the range of 5 to 14, preferably in the range of 8.5 to 9.5 such that substantially the whole of metal values including zinc is precipitated as oxide forms and the whole or a major part of lime is converted to gypsum. The third stage may be operated successfully at temperature up to boiling points of the solution at atmospheric pressure, preferably in the range of 60 to 95° C. The pulp leaving the third stage is sent to the flotation stage with or without solid-liquid separation. In some circumstance, it may be desirable to re-circulate portions of pulp or thickened pulp from the third stage to very beginning or in the process of third stages of the process.

In some circumstances, it may be desirable to purify the liquor before third stage. In this case, zinc dust may be added into the solution with or without other reagent such as copper sulphate, arsenic trioxide and/or antimony. The preferable condition will be pH in the range of 3 to 6, preferably in the range of 4.0 to 5.0, and temperature in the range of 60 to 95° C. The residence time of this process may be in the range of 1 to 4 hours.

The use of CaO as the neutralizing reagent results, theoretically, in the following reactions:

$$ZnSO_4 + H_2O \rightarrow ZnO + H_2SO_4 \text{ (hydrolysis)} \quad (1)$$

$$H_2SO_4 + CaO \rightarrow CaSO_4 + H_2O \text{ (neutralization)} \quad (2)$$

$$ZnSO_4 + CaO \rightarrow ZnO + CaSO_4 \text{ (overall)} \quad (3)$$

This series of reactions represents a conventional neutralization process with the objective of generating a ZnO product of high purity.

4. Flotation

The next stage is where the pulp from the third stage or the re-pulped cake from the solid-liquid separation is subjected to the flotation step. Flotation is a process for separating finely ground minerals from their associated gangue. This process is usually used to separate one solid from another by using the affinity of air bubbles to solids. In this stage, zinc oxide including metal oxides or hydroxides is recovered by flotation concentrate and gypsum is recovered as tailing. Cationic collectors, such as dodecylamine hydrochloride, are used as flotation agents. Potassium amyl xanthate or dodecylamine sulphate may be used for this purpose. Any frother could be used, but a Dowfroth 250 was found useful. The flotation process may be operated at ambient temperature and also successfully at temperature up to 90° C. and the pulp from the third stage may be used without any heating or cooling stages. The gypsum from the flotation step can be recycled to either of the leaching or neutralization steps.

The ZnO product obtained according to the present invention could be introduced in an entirely independent circuit in a zinc refinery, or it could be introduced in an existing plant circuit for increasing plant capacity through full operation of a cellhouse. The ZnO product can be dissolved very easily in spent electrolyte at room temperature and the dissolved zinc can be recovered by electrowinning method.

5. Granulometric Sizing

This operation may be used in conjunction with, or as an alternative to, flotation. The sizing may be performed by any method, either individually or in combination. For example, sizing may be performed by using one or more of the following techniques: classifier, elutriation, settling, screening, tables, and cyclones. A classifier is a device for subjecting comminuted ore to the action of water either in such a way that a division of the ore particle is made into two or more products according to relative settling powers. Cyclones are devices primarily used for separation of solids from fluids. Cyclones oppose centrifugal forces collinear to fluid drag, substantially at right angles to a rapid carrying current. Since such separation depends on relative particle size and specific gravity, it can be used for separation of solids from each other.

From the zinc oxide precipitation step, the zinc oxide in the precipitated slurry can be separated from gypsum by a screening technology that uses appropriate sieves. In this stage, the precipitated slurry is wet-screened with a series of sieves and the undersized materials are collected for the final product. The oversized materials are collected and recycled to the leaching or neutralization step. Also, the oversized materials can be leached with sulphuric acid to dissolve zinc. Then, the zinc bearing solution can be recycled to the leaching, neutralization or precipitation stage to recover zinc. The leached residue can be washed and recovered as pure gypsum. The undersized materials also can be treated further by flotation or granulometric operation, as described in the previous sections, to increase zinc grade.

Figure 3:
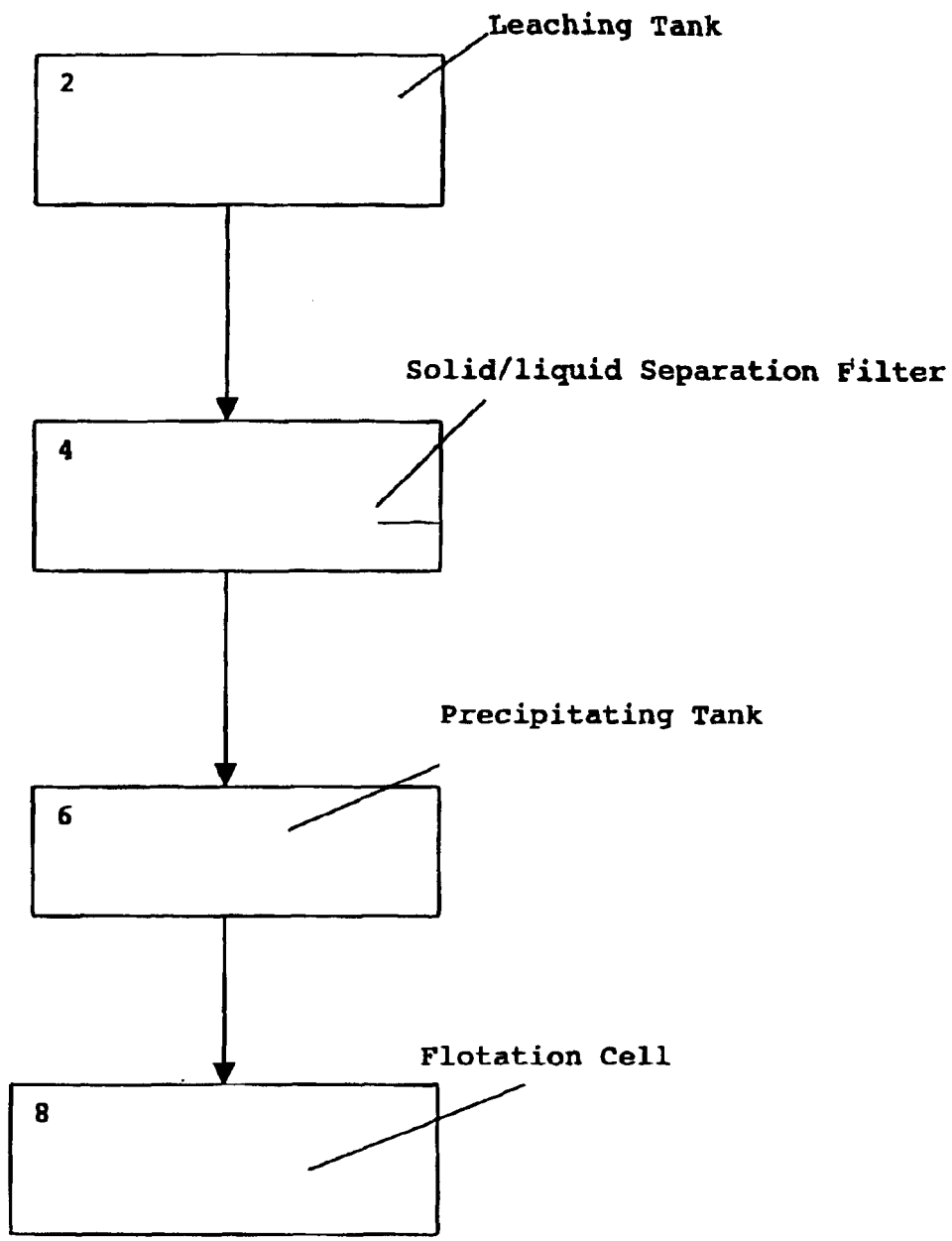
FIG. 3 is a schematic block diagram depicting the apparatus according to the present invention.

FIG. 3 depicts an apparatus of the present invention. Leaching Tank 2 is used to leach an acid soluble zinc-containing material with sulphuric acid. After separation in the Solid-liquid Separation Tank 4, the leach solution is then sent to Precipitating Tank 6 where the precipitation is performed. After the precipitate solution is sent to Flotation Cell 8 to separate the precipitated zinc oxide from gypsum, which is co-precipitated during the precipitation process. It is, however, to be understood that the apparatus is not limited to the disclosed embodiment. Persons with skill in the art will know that many different apparatuses can be constructed with equivalent arrangements and still be within the spirit and scope of the appended claims. For example, the precipitation means can take place in one or more tanks (vessels). In addition, the means to convey the material from each of these tanks are numerous and well known in the art.

EXAMPLES

The present invention will now be described with reference to the following examples. It should be noted that although a complete process described in here is applicable for any leaching solutions which bear zinc, the following examples will focus on the precipitation of zinc oxide from leaching solutions originated from the zinc oxide ores.

Example 1

A zinc oxide ore containing 31.4% total zinc, 5.06% silica and 2.49% iron was treated by two-stage continuous process in accordance with the invention using sulphuric acid solution. Leaching (first stage) and silica removal (second stage) tests were conducted in 4.0-L reactor equipped with baffle. The pH of the pulp was maintained by adding sulphuric acid at 2.0 and leaching temperature was controlled at 50° C. for 4 hours. The agitation speed was set at 750 rpm. The second stage was performed in the same reactor without previous solid-liquid separation using $Ca(OH)_2$ for neutralisation to pH 4.0 for 3 hours. The agitation speed was set at 900 rpm. After neutralisation, the slurry was filtered and the filtrate was saved for the precipitation test.

The zinc extraction was 90% and the acid consumption was 2.52 t/t of zinc extracted. The $Ca(OH)_2$ consumption for neutralisation was 0.18 t/t of zinc extracted. The final filtrate contained 47.1 g/l zinc, and 119 mg/l silica.

Zinc precipitation (third stage) test was conducted in 2.0-L reactor equipped with baffle. The pH was monitored and controlled at 9.5 with a pH meter. Precipitation temperature was controlled at 90° C. and the agitation speed at 750 rpm. The tests were conducted in a continuous mode for three retention times of 30 minutes, for total test duration of 90 minutes. The test consisted in neutralizing a $ZnSO_4$ solution from the second stage with Ca(OH)$_2$. The zinc sulphate solution at 47.1 g/L of Zn was pumped continuously at 50.0 ml/min into a 2.0-L reactor. The zinc solution was neutralized to pH 9.5 with a calcium hydroxide slurry at 20%. During the test, 5000 ml of ZnSO$_4$ at 47.1 g/l of Zn was neutralized with 1455 ml of lime slurry at 20% producing 923 g of precipitate. Results showed a complete removal of Zn (more than 99.9%) from the ZnSO$_4$ solution with a residual Zn concentration in the filtrate of 1.6 mg/L. The solids produced were approximately 25% Zn, this Zn content indicated production of good quality ZnO and CaSO$_4$.2H$_2$O since Zn content of pure mixture of ZnO and CaSO$_4$.2H$_2$O is 26%. In addition, analysis of the solids by X-Ray Diffraction confirmed the presence of hexagonal Zincite (ZnO) and monoclinic Gypsum (CaSO$_4$.2H$_2$O) as major phases. Stoichiometric calculation based on equation (3) showed that only 4% excess of Ca(OH)$_2$ was used to precipitate Zn content of the total volume of ZnSO$_4$ solution treated. In addition, calculated mass of ZnO+CaSO$_4$.2H$_2$O produced according to equation (3) and based on the Zn treated would be 954 g or 103% of the mass of precipitate measured.

The solid from third stage (zinc precipitation) was mixed with filtrate of the precipitation test and mechanically stirred to obtain a slurry. The weight of the solid taken on dry basis was 166.0 g. The flotation test was conducted in a 1 liter laboratory Denver flotation cell at 1200 rpm. The collector solution of the required, DDA (dodecylamine hydrochloride, C$_{12}$H$_{23}$NH$_2$HCl), was mixed with flotation pulp. The volume of collector added was 3 mg followed by adding 0.05 ml of frother, Dowfroth 250C. The concentrate was collected for 3 minutes and filter, dried and weighed. Result showed 77.5% of zinc was recovered and the grade of concentrate was 41.2% zinc. The amount of zinc in the tailing was found to be 10.8%, however, this zinc can be recycled to the first stage for recovery.

Example 2

From the same solid of the third stage of Example 1, the slurry was screened with 400 mesh sieve. The undersized material is 48% Zn and the zinc recovery was 92%. The oversized material is 22.7% Ca and 3.8% Zn. The same sample was screened with 635 mesh sieve. The undersized material was 56.5% Zn and the zinc recovery was 87.4%.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions

What is claimed is:

1. A method for producing zinc oxide from an acid soluble zinc-containing material, comprising the steps of:
    (a) leaching the acid soluble zinc-containing material with sulphuric acid to produce a leach solution; and
    (b) precipitating an iron and silica precipitate in solution from the leach solution with any of calcium oxide, Ca(OH)$_2$, MgO, and ZnO; and
    (c) precipitating zinc oxide from the iron and silica precipitation solution with either calcium oxide or Ca(OH)$_2$; and
    (d) separating said precipitated zinc oxide from gypsum, which is co-precipitated during the step (c), by flotation.

2. A method according to claim 1, wherein said acid soluble zinc-containing material is leached with sulphuric acid to an end-point pH that is between substantially pH 1.5 and substantially pH 2.5.

3. A method according to claim 1, wherein calcium oxide is provided to precipitate iron and silica from the leach solution.

4. A method according to claim 1, wherein C(OH)$_2$ is used to precipitate iron and silica from the leach solution.

5. A method according to claim 1, wherein MgO is provided to precipitate iron and silica from the leach solution.

6. A method according to claim 1, wherein ZnO is provided to precipitate iron and silica from the leach solution.

7. A method according to claim 1, wherein step (b) raises the end-point pH of the leach solution to between substantially pH 3.5 and pH 4.5.

8. A method according to claim 1, wherein the iron and silica precipitation solution is subjected to a solid liquid separation process and cemented with zinc dust to remove any of copper cadmium, nickel, and cobalt.

9. A method according to claim 1, wherein step (c) raises the end-point pH to between substantially pH 8.5 and substantially pH 9.5.

10. A method according to claim 1, wherein calcium oxide is provided to precipitate zinc oxide.

11. A method according to claim 1, wherein Ca(OH)$_2$ is provided to precipitate zinc oxide.

12. A method according to claim 1, wherein step (d) includes providing a cationic collector.

13. A method according to claim 12, wherein the cationic collector is dodecylamine hydrochloride.

14. A method according to claim 12, wherein the cationic collector is dodecylamine sulphate.

15. A method according to claim 12, wherein the cationic collector is potassium amyl xanthate.

16. A method according to claim 1, wherein the tailing of step (d) is recycled to step (a) to recover zinc value.

17. A method for producing zinc oxide from an acid soluble zinc-containing material, comprising the steps of:
    (a) leaching the acid soluble zinc-containing material with sulphuric acid to produce a leach solution; and
    (b) precipitating iron and silica from the leach solution with any of calcium oxide, Ca(OH)$_2$, MgO, and ZnO to produce an iron and silica precipitation solution; and
    (c) precipitating zinc oxide from the iron and silica precipitation solution with either calcium oxide or Ca(OH)$_2$; and
    (d) separating said precipitated zinc oxide from gypsum, which is co-precipitated during step (a) by granulometric sizing.

18. A method according to claim 17, wherein calcium oxide is provided to precipitate iron and silica from the leach solution.

19. A method according to claim 17, wherein Ca(OH)$_2$ is provided to precipitate iron and silica from the leach solution.

20. A method according to claim 17, wherein MgO is provided to precipitate iron and silica from the leach solution.

* * * * *

UNITED STATES PATENT AND TRADEMARK OFFICE
CERTIFICATE OF CORRECTION

PATENT NO. : 6,726,889 B2
DATED : April 27, 2004
INVENTOR(S) : Choi et al.

It is certified that error appears in the above-identified patent and that said Letters Patent is hereby corrected as shown below:

Column 8,
Line 8, "A method according to Claim 1, wherein $C(OH)_2$ is provided to precipitate iron and silica from the leach solution." should read as follows:
-- A method according to Claim 1, wherein $Ca(OH)_2$ is provided to precipitate iron and silica from the leach solution --
Line 54, "...which is co-precipitated during step (a) by granulometric sizing." should read as follows: -- ...which is co-precipitated during step (c) by granulometric sizing. --

Signed and Sealed this

Seventh Day of December, 2004

JON W. DUDAS
*Director of the United States Patent and Trademark Office*